(12) United States Patent
Ruhl

(10) Patent No.: US 9,655,470 B2
(45) Date of Patent: May 23, 2017

(54) INJECTION UNIT HAVING A RESILIENT SUSPENSION DEVICE FOR THE GROUP HEAD OF A SO-CALLED ESPRESSO COFFEE MACHINE

(75) Inventor: Christian Ruhl, Oberschaeffolsheim (FR)

(73) Assignee: RENEKA INTERNATIONAL, Rosheim (FR)

( * ) Notice: Subject to any disclaimer, the term of this patent is extended or adjusted under 35 U.S.C. 154(b) by 665 days.

(21) Appl. No.: 14/112,842

(22) PCT Filed: Mar. 29, 2012

(86) PCT No.: PCT/IB2012/051528
§ 371 (c)(1),
(2), (4) Date: Apr. 1, 2014

(87) PCT Pub. No.: WO2012/143806
PCT Pub. Date: Oct. 26, 2012

(65) Prior Publication Data
US 2014/0216266 A1    Aug. 7, 2014

(30) Foreign Application Priority Data

Apr. 18, 2011 (FR) ...................... 11 53351

(51) Int. Cl.
*A47J 31/06* (2006.01)
*A47J 31/46* (2006.01)
(Continued)

(52) U.S. Cl.
CPC ........... *A47J 31/46* (2013.01); *A47J 31/0663* (2013.01); *A47J 31/0684* (2013.01); *A47J 31/3671* (2013.01); *A47J 31/4464* (2013.01)

(58) Field of Classification Search
CPC ............... A47J 31/0663; A47J 31/0657; A47J 31/0684; A47J 31/3671
(Continued)

(56) References Cited

U.S. PATENT DOCUMENTS 4,429,623 A * 2/1984 Illy .................... A47J 31/0668
99/295
5,870,943 A 2/1999 Levi et al.
(Continued)

FOREIGN PATENT DOCUMENTS

EP    0 496 688    7/1992
EP    1 034 729    9/2000
(Continued)

OTHER PUBLICATIONS

International Search Report Issued May 15, 2012 in PCT/IB12/051528 Filed Mar. 29, 2012.

*Primary Examiner* — Reginald L Alexander
(74) *Attorney, Agent, or Firm* — Oblon, McClelland, Maier & Neustadt, L.L.P.

(57) ABSTRACT

The invention relates to an injection unit (1) for an espresso coffee machine including a stationary mechanical upper block (2) having a central projection (4) which forms a hot-water dispenser (7) and to which a removable portion, referred to as the group head (8), is attached, the inner surface of the group head having a cavity (22) in which the portafilter (9) is mounted, said portafilter comprising an operating handle (10) and a recess for holding a basket (11) containing the coffee grounds for preparing espresso coffee, characterized in that the group head (8) is attached to the mechanical block (2) of the injection unit (1) via a linking device having a resilient effect, and in that the seal (23) surrounding the dispenser (7) engages with the inner periphery of the basket (11). The invention is useful for manufacturers of espresso coffee machines.

5 Claims, 4 Drawing Sheets

Figure 1:
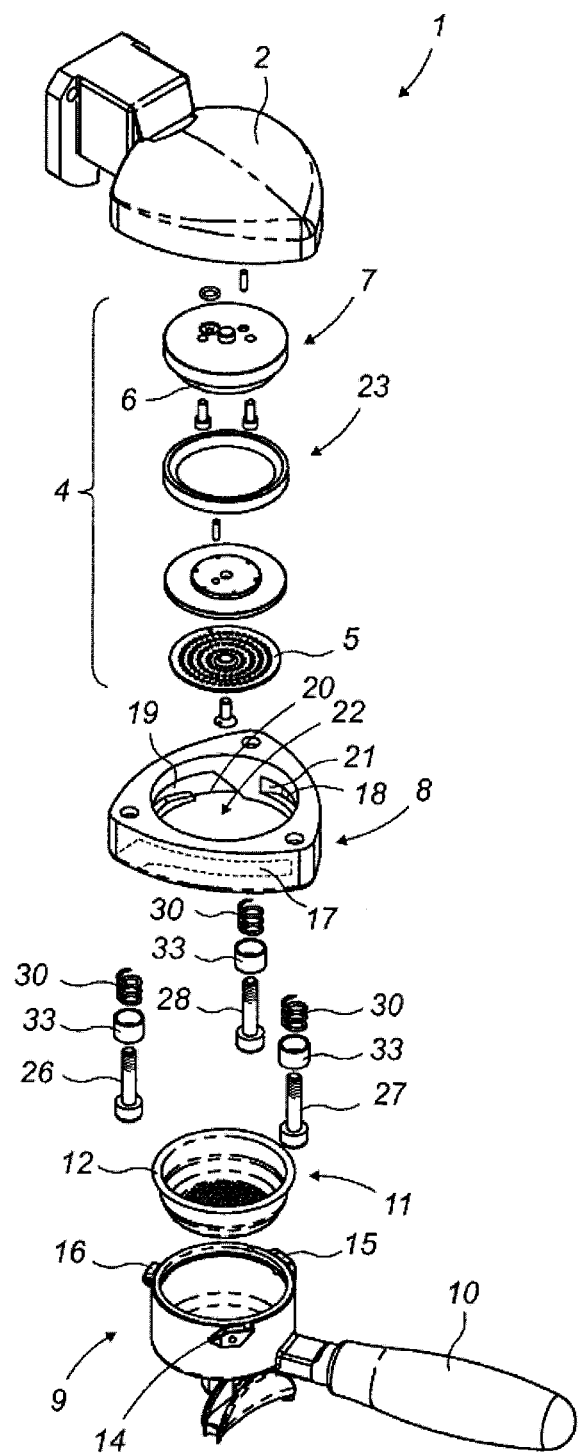

(51) Int. Cl.
*A47J 31/36* (2006.01)
*A47J 31/44* (2006.01)

(58) Field of Classification Search
USPC .............................................. 99/302 R, 323
See application file for complete search history.

(56) References Cited

U.S. PATENT DOCUMENTS

| | | | | |
|---|---|---|---|---|
| 7,028,604 B2* | 4/2006 | Cortese | ............... | A47J 31/3628 99/295 |
| 7,730,829 B2* | 6/2010 | Hammad | ............ | A47J 31/0684 99/295 |
| 8,844,430 B2* | 9/2014 | Mastropasqua | ..... | A47J 31/0663 99/289 R |
| 2006/0266222 A1 | 11/2006 | Hammad | | |

FOREIGN PATENT DOCUMENTS

| | | | | | |
|---|---|---|---|---|---|
| FR | 2671708 | * | 1/1991 | .......... | A47J 31/0663 |
| WO | 96 27316 | | 9/1996 | | |
| WO | 2006 127118 | | 11/2006 | | |

* cited by examiner

INJECTION UNIT HAVING A RESILIENT SUSPENSION DEVICE FOR THE GROUP HEAD OF A SO-CALLED ESPRESSO COFFEE MACHINE

The present invention relates to a percolation station for a machine for preparing coffee of the espresso type. According to the special feature of this percolation station, the part which is used to support the portafilter, and which is conventionally known as the group head, is mounted via a resilient suspension device on the mechanical unit of the injection unit of this coffee percolation station.

Espresso-type coffee machines comprise one or more portafilters or filter holders that form a housing for a receptacle known as the filter basket that contains the coffee grounds and each of which are extended by a single or double pouring spout. These portafilters all have a lateral extension in the form of a handle.

These portafilters or filter holders are mounted on the underside of a mechanical assembly referred to as the injection unit which comprises a fixed mechanical unit the lower part of which has a cavity in the central part of the bottom of which there emerges a distributor from which hot water is ejected under pressure onto the grounds. These portafilters conventionally have two lugs collaborating with two oblique or helical grooves formed in the internal lateral surface of the lower part, referred to as the group head, of the injection unit.

A machine may comprise several injection units each able to prepare one or two cups of coffee from one single dose of grounds.

Each portafilter is mounted on the lower part of the injection unit through a pivoting movement, for example through one quarter of a turn, during which the upper surfaces of the filter basket and of the grounds volume move closer to the exterior face of the distributor and of the seal that surrounds it until the upper outer edge of the filter basket comes into sealed contact with the planar lower face of this seal surrounding the distributor.

The last part of the pivoting travel of the portafilter clamps the filter basket against this seal. This end of travel requires a degree of effort that varies according to how full the filter basket is of grounds.

While the degree of clamping has practically no influence over the quality of the coffee, there is the disadvantage whereby, in order to obtain the necessary seal, it is necessary to apply sufficient clamping effort, resulting in a movement in which the upper edge of the filter basket rubs against the exterior lower face of the seal which becomes worn and deformed with use, and does so in such a way that the final pivoting travel of the filter holder becomes progressively longer.

This lengthening of the pivoting travel has to be compensated for in order to prevent the handles of two adjacent filter holders from becoming so close together in their final position that they interfere with one another and become awkward to handle.

The seal has therefore to be changed and readjustments have to be made.

The object of the present invention is greater ease of engagement without having to force it through a securing gesture which guarantees sealing from the outset and introduces no variation in the final position of the handle while at the same time allowing some variation in the dose of coffee, i.e. some variation in the volume of grounds.

In order to address this technical problem, the injection unit for a coffee machine of the espresso type according to the invention comprises a fixed upper mechanical unit having a central projection forming a hot water distributor and to which is fixed a removable part known as a group head the interior surface of which has a cavity in which there is mounted a portafilter comprising an operating handle, and a housing for accommodating a filter basket containing coffee grounds for the preparation of coffee of the espresso type. According to this the invention, the filter basket bears in a sealed manner against a seal surrounding the central projection and this injection unit is characterized in that:

the group head is fixed to the fixed upper mechanical unit of the injection unit by a resilient-effect connecting device that affords the group head a distancing travel with respect to the fixed upper mechanical unit, the seal surrounding the distributor bears against the upper interior periphery of the filter basket to form a dynamic sliding seal.

As a result, any adjustment or replacement of the seal becomes needless because it is no longer subjected to friction and its life is appreciably lengthened.

Moreover, compression of the grounds is of little importance. Any possible heightwise overfilling with grounds in habitual use is automatically absorbed.

In addition, the group head is easily removable from the mechanical unit of the injection unit. The resilient-effect connection of the group head reduces maintenance and provides a certain level of comfort and great ease of use for the staff working with the machine.

Figure 2:
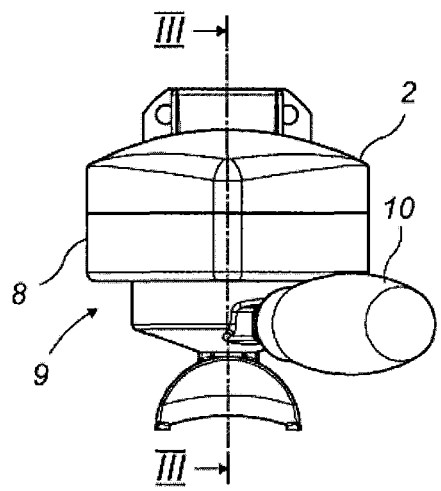
Figure 3:
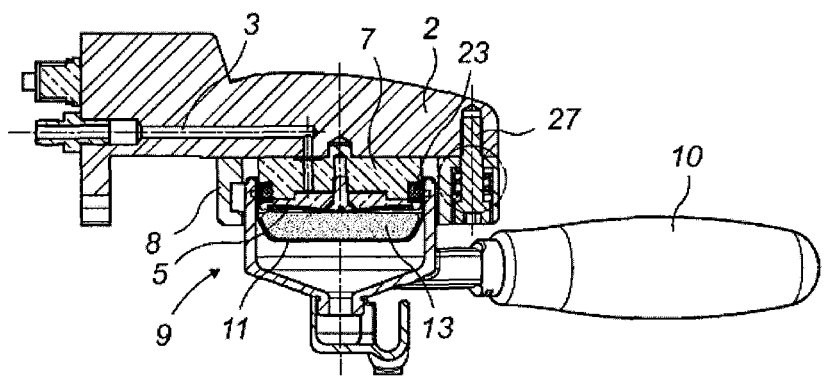
Figure 6:
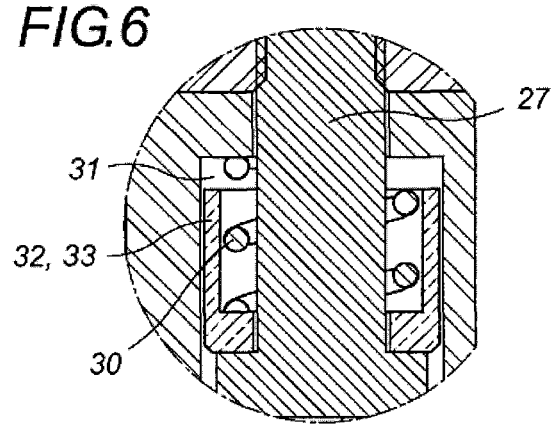
Figure 4:
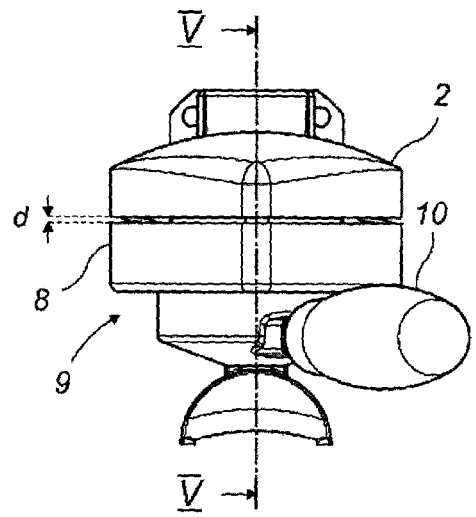
Figure 5:
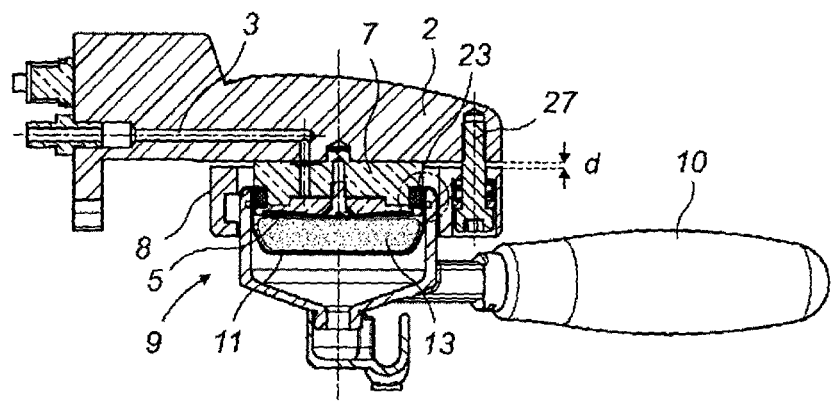
Figure 7:
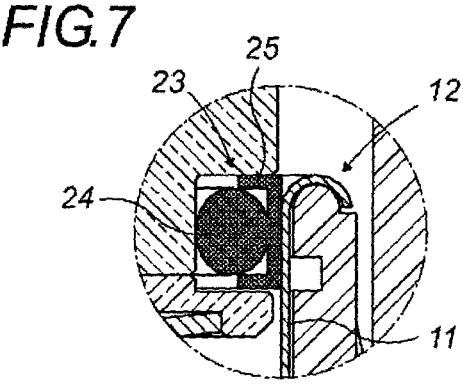
Figure 8:
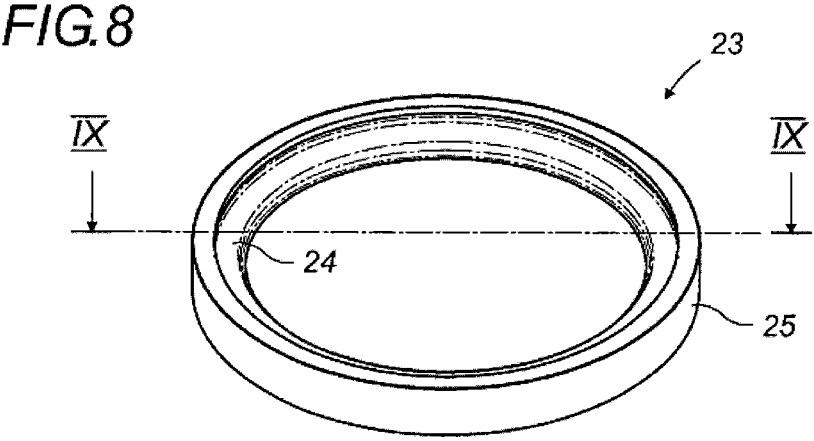
Figures 9, 10:
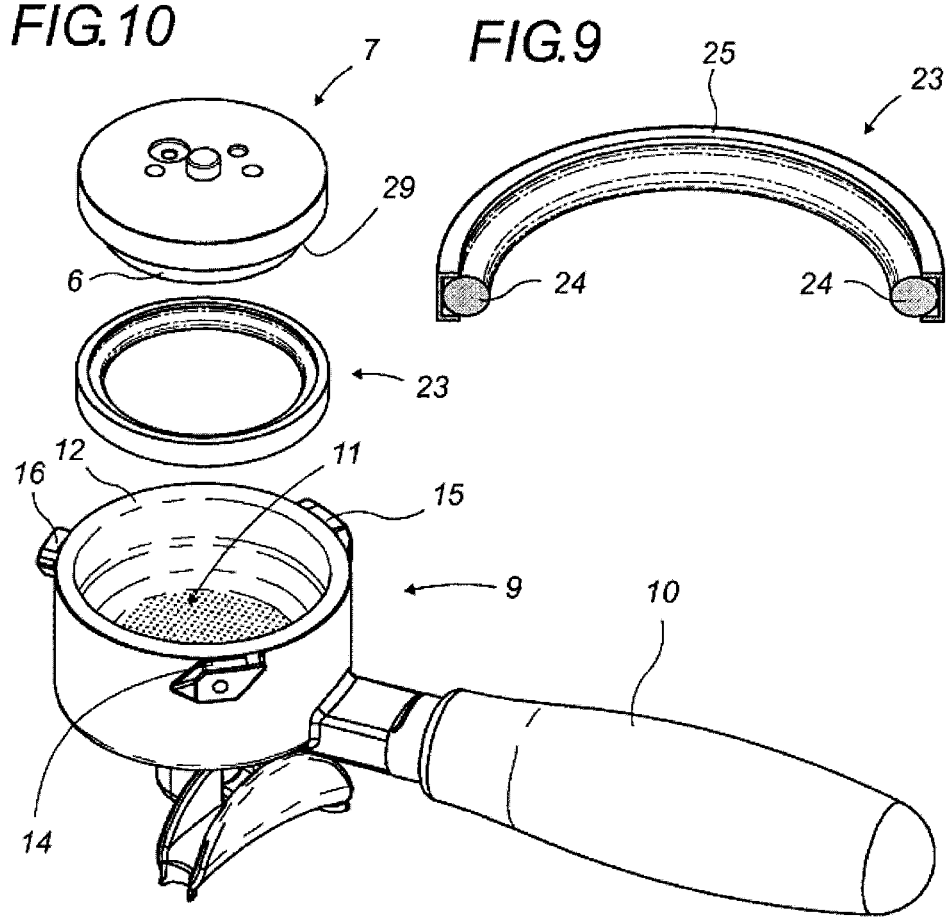

Other features and advantages of the invention will become apparent from the description which follows, which is given by way of example and accompanied by the drawings in which:

FIG. 1 is an exploded perspective view of the injection unit and of the portafilter-filter basket assembly showing the main characteristics of the invention;

FIGS. 2 and 3 and then 4 and 5 are views each time respectively in elevation and in longitudinal section of the percolation station according to the invention, firstly in a raised position and secondly in a lowered position of the group head corresponding to two different height-of-grounds scenarios, the first height being lower in the case of FIGS. 2 and 3 and the second higher in the case of FIGS. 4 and 5 showing a distancing travel "d" of the group head with respect to the underside of the fixed mechanical unit of the injection unit;

FIG. 6 is a detailed view of the assembly device showing the screw and its distancing spring corresponding to the ringed part of FIG. 3;

FIG. 7 is a detailed cross section through the seal showing the position of the rim of the filter basket with respect to the seal and corresponding to the ringed part of FIG. 5, FIG. 8 is a perspective view of the seal and of its gasket, FIG. 9 is a view partly in perspective and partly in section on IX-IX of FIG. 8 showing the seal, FIG. 10 is an exploded perspective view of the assembly formed of the portafilter, the filter basket, the seal at the head of the distributor.

The present invention relates in general to a coffee percolation station in a machine for preparing coffee of the type known as espresso.

In the conventional way, a percolation station comprises an injection unit 1 to which various elements and removable components are attached for refilling with grounds representing a dose of powdered coffee, as will be seen hereinafter.

The mechanical assembly of the injection unit 1 is made up of a fixed upper mechanical unit 2 having an injection pipe 3 and a central cylindrical projection 4 in the lower central part, for example as a lump, protected by a distribution filter 5 in the form of a perforated disk that forms the outlet face of the head of a distributor 7 of pressurized hot water. The fixed upper mechanical unit 2 of the injection unit 1 serves to support a removable support part referred to as a group head 8 which is assembled with this fixed upper mechanical unit 2 by fixing means which, according to the invention, exhibit a resilient effect.

A portafilter 9 or filter holder having an operating handle 10 and bearing a filter basket 11 with an upper peripheral rim 12 containing coffee grounds 13 is mounted on the group head 8.

The portafilter 9 has, formed as projections from its exterior lateral surface or attached thereto, three retaining lugs 14, 15 and 16 collaborating with three corresponding grooves 17, 18, 19 in the form of oblique or helical ramps, each having an inlet notch such as 20 formed in the interior lateral surface of the group head 8 and via which the portafilter 9 is mounted on the group head after each retaining lug 14, 15 and 16 has entered a corresponding inlet notch 20 and undergone a pivoting movement as far as a straight or oblique stop surface such as 21 which marks the mechanical end of each groove.

The group head 8 is a body of annular overall shape having a free central space 22 occupied by the head 6 of the distributor 7 when the group head is mounted on the fixed upper mechanical unit 2.

The injection unit 1 also has, by way of attached component, a special seal 23 positioned around the central projection 4 that forms the body of the distributor 7, as FIGS. 3, 5 and 10 show. This seal 23 is composite, made up of an O-ring 24 housed in, and held by, an annular gasket 25 made of a material which is flexible but harder than the material of the O-ring, as depicted in FIGS. 8 and 9. This annular gasket 25 serves as a protective housing for it. It is open over the entirety of its internal lateral face.

This seal bears against the upper interior peripheral lateral surface of the filter basket 11.

The group head 9 is mounted on the fixed upper mechanical unit 2 of the injection unit 1 via a resilient-effect connecting device or means, for example, as depicted in the figures, formed of several mounting screws, for example three screws 26, 27 and 28, with a spring effect to absorb variations in the height of the grounds 13. Thus, variations by 1 to 3 grams, which correspond to the variations encountered between the various doses in common use resulting from coffee mill spread, can be tolerated.

As can be seen in FIGS. 1, 3 and 5, each mounting screw 26, 27 and 28 provides working or adaptation latitude because of its resilient-effect sliding device but allows a longitudinal adaptation travel "d" for adapting to the possible variations in the height of grounds 13, through movement of the group head 9.

The pivoting movement is limited by the straight or oblique end-of-travel surfaces such as 21 that mark the mechanical limit of each groove 17, 18 and 19. Each surface 21 constitutes an end stop for each corresponding retaining lug 14, 15 and 16 of the portafilter 9.

It can be noted here that that there is absolutely no need to force the issue with clamping because the resilient-effect attachment of the group head 8 to the fixed upper mechanical unit 2 partially compensates for clamping force with a view to obtaining a seal and with a view to ensuring that the end-of-travel position is properly delimited by the end-of-groove stops and is so irrespective of the quantity of grounds 13 present in the filter basket 11.

Sealing is guaranteed by the composite seal 23 described above against the external contour of which the upper zone of the interior face of the lateral wall of the filter basket 11 delimited by its peripheral rim 12 bears during the pivoting movement of the handle.

As already indicated, this composite seal device 23 may, for example, take the form of an annular gasket 25 with an open interior lateral surface serving to house an O-ring 24 as visible in FIGS. 3 and 5.

The annular gasket 25 is pressed against the exterior lateral surface of the head 6 of the distributor 7 or is mounted in a peripheral shoulder such as 29 or in a groove surrounding this head.

The various advantages associated with the invention stem from the peculiarities of the composite seal 23 and how it is mounted, and also from the resilient suspension system via which the group head 8 is mounted on the fixed upper mechanical unit 2 of the injection unit 1.

One embodiment of a resilient-effect mounting connection that allows the group head 8 a distancing travel referenced "d" with respect to the fixed upper mechanical unit 2 of the injection unit 1 will now be described hereinafter with reference to FIGS. 1, 3, 5 and 6. This distancing travel "d" is enough to automatically absorb the usual discrepancies in volume and therefore in height of grounds 13 in the filter basket 11 while at the same time maintaining the level of sealing required for correct operation in the production of coffee of the type referred to as espresso.

The group head 8, which is the removable support part, is assembled via at least three screws 26, 27 and 28 with the fixed upper mechanical unit 2 of the injection unit 1 as can be seen in FIGS. 1, 3 and 5.

A helical spring such as 30 has been slipped over the end of each of these screws 26, 27 and 28 and bears in the bottom of each housing such as 31 provided in the body of the group head 8 that each corresponding spring enters. Each head of each screw 26, 27 and 28 remains level with the underside of the group head 8. The screws are, for example, hexagon socket head screws. The springs 30 give the group head 8 a resilient travel away from the fixed upper mechanical unit 2 of the injection unit 1 by the distance "d" that may correspond to the difference in length between a partially compressed state and an almost fully compressed state of each spring 30 as a result of the downward movement of the group head 8 providing grounds-height adjustment while guaranteeing sealing.

To limit this distance, a stop 32 is introduced, for example in the form of a sleeve 33 mounted around each distancing spring 30 and pressing against the underside of the head of each screw 26, 27 and 28. The sleeve 33 acts as a stop by limiting the travel of the group head 8 as its frontal edge presses against the bottom of the housing 31.

This movement, associated with the spring effect, is used to automatically compensate for differences in the height of the grounds 13. It is limited by the abutment of the frontal edge of the sleeve 33 against the bottom of the housing 21.

The group head 8 is thus suspended elastically from the fixed upper mechanical unit 2 of the injection unit 1 and provides automatic adaptation to suit the variations in volume of the dose of grounds while at the same time ensuring sealing and keeping the handle 10 in the same position.

The invention claimed is:

1. An injection unit for a coffee machine of the espresso type, comprising:
   a fixed upper mechanical unit having a central projection forming a hot water distributor and to which is fixed a removable part known as a group head, an interior surface of the group head has a cavity below which there is a portafilter having an operating handle;

a housing for accommodating a filter basket containing coffee grounds for the preparation of coffee of the espresso type;

the portafilter mounted on the group head by collaboration of lugs in grooves during a pivoting movement;

the filter basket bearing in a sealed manner against the central projection;

a resilient suspension system which connects the group head to the fixed upper mechanical unit of the injection unit and which has a spring providing a restoring force opposing downward movement of the group head with respect to the fixed upper mechanical unit; and a seal surrounding the hot water distributor bears against the upper interior periphery of the filter basket thus sealing as the operating handle is pivoted.

2. The injection unit as claimed in claim 1, wherein the resilient suspension system comprises a resilient-effect connecting device including at least three screws passing through the group head and screwed into the fixed upper mechanical unit opposite, and the screws are each fitted with said spring that provides said restoring force upon becoming compressed by the downward movement of the group head.

3. The injection unit as claimed in claim 2, wherein the downward movement of the group head is limited by a stop.

4. The injection unit as claimed in claim 3, wherein the stop is a sleeve mounted coaxially on each screw between the spring and the screw head.

5. The injection unit as claimed in claim 1, wherein the seal takes the form of an annular gasket with an open interior lateral surface serving to house an O-ring.

* * * * *